Dec. 20, 1938.  L. H. STEIN  2,140,818
ANTIFRICTION BEARING
Filed Nov. 22, 1937
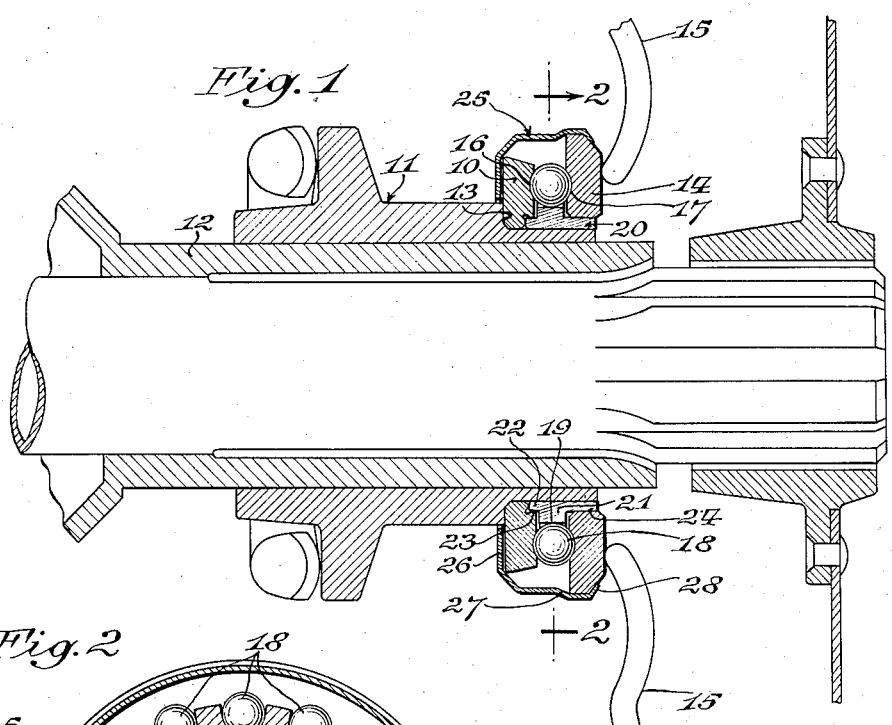
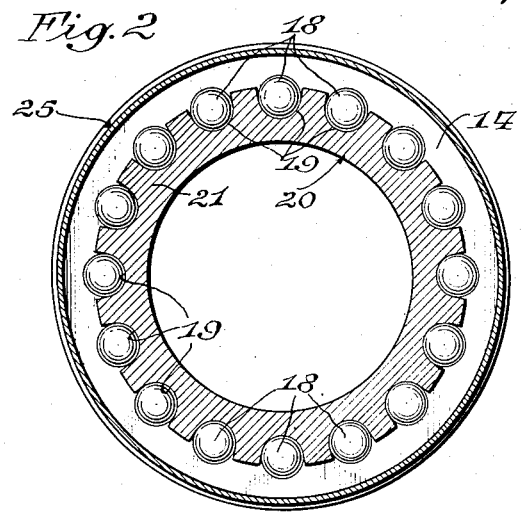
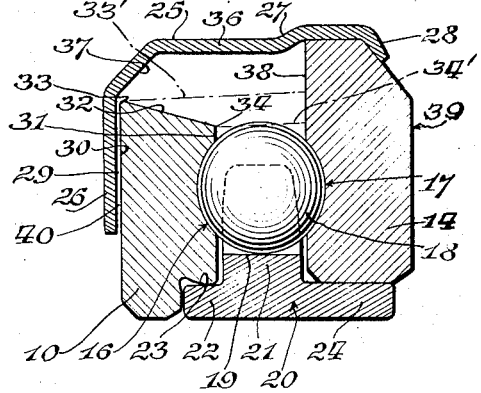
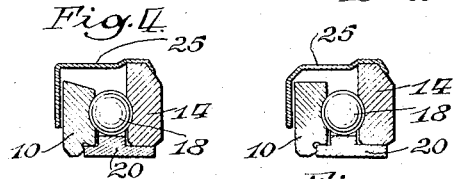
Inventor
Louis H. Stein
By Williams, Bradbury, McCaleb & Hinkle
Attys.

Patented Dec. 20, 1938

2,140,818

UNITED STATES PATENT OFFICE

2,140,818

ANTIFRICTION BEARING

Louis H. Stein, Chicago, Ill., assignor to Aetna Ball Bearing Manufacturing Company, Chicago, Ill., a corporation of Illinois Application November 22, 1937, Serial No. 175,779

9 Claims. (Cl. 308—233)

My invention relates to anti-friction bearings, and more especially to the thrust type of ball bearings arranged on a horizontal axis to serve as a clutch throw-out bearing for automotive vehicles, although many features of my invention are not limited to this particular type of bearing.

My present invention has two chief objects. The first is to prevent leakage of grease so that the bearing can be initially packed with grease at the factory and maintain an ample supply of grease throughout the life of the bearing or the life of the vehicle in which it is used. The second is to prevent the drying up of the grease, either generally or locally where it will impede the proper and continued lubrication of the bearing.

Previous attempts to render bearings—and especially clutch throw-out bearings—capable of retaining an ample supply of grease over long periods of running time without refilling, have, for the most part, been along the lines of adding to the bearing a formal sealing member. In some instances the sealing member has been inherently resilient, in other instances it has been spring pressed, but in either case there was friction pressure applied at the seal. This would tend to wear one or the other of the sealing surfaces and would provide a frictional drag on the bearing. In its application to the usual clutch throw-out bearing, the resulting frictional drag as between the fixed race and the loose race would cause a relative rotation between the loose race and the clutch fingers. The clutch fingers would drag around the finger contacting face of the loose race until such time as there was sufficient axial thrust or load applied to the bearing to cause the frictional contact of the fingers with the loose race to exceed the frictional drag of the sealing member. During that interval, objectionable noise would be produced and there would be also wear on the fingers or finger contacting face of the loose race. The friction of the sealing member would often also create enough heat to expand whatever air there may be within the bearings, creating an abnormal inside pressure due to the air expansion. This would be released by a slight explosion within the bearing, causing a quantity of grease to be blown out. For these and other reasons an approach to the problem by means of an added frictional sealing member has left much to be desired in performance, and has added to the expense and complication of the bearing.

In my solution of the problem, I have sought to avoid the addition of more parts, but rather to retain only the parts customarily essential in such bearings and re-form or rearrange those parts to take advantage of the forces and factors potentially present within the bearing itself and utilize them to prevent the escape of grease from the bearing.

Somewhat similarly I have taken advantage of these forces and factors to enlarge the grease supply space and to promote internal circulation, calculated to avoid general or localized hardening of the grease, all without the necessity of increasing the over-all dimension of a given bearing or weakening its essential structure.

Tests of clutch throw-out bearings incorporating my invention have shown that the bearings will run indefinitely at high speed and at relatively high temperature, without the loss of any appreciable quantity of grease within the bearing and without any discernible general or localized hardening of the grease, and this despite the continual subjecting of the bearing, at frequent intervals, to the thrust load, which in standard bearings of this type has a pumping action tending to extrude grease from the clearance space between the rotary and fixed members.

The foregoing together with further objects, features and advantages of my invention are set forth in the following description of specific embodiments thereof illustrated in the accompanying drawing wherein:

Fig. 1 is a vertical longitudinal cross section of a typical automobile clutch release or throw-out bearing, modified to embody my invention;

Fig. 2 is a transverse section thereof taken on the line 2—2 of Fig. 1;

Fig. 3 is an enlarged radial section through the bearing which may be considered as an enlargement of a portion of Fig. 1;

Figs. 4 and 5 are views similar to Fig. 3, but on the scale of Fig. 1, showing modifications.

In the drawing, I have illustrated my present invention as incorporated in an automobile clutch release ball bearing of the type, and embodying some of the improvements, disclosed in my Patent No. 1,958,725 of May 15, 1934.

The fixed race ring 10 is a drive fit on a sliding or floating hub 11, reciprocally mounted on the stationary tubular support 12, the race ring 10 abutting a shoulder 13 on the sliding hub 11. The sliding hub, it will be understood, is reciprocated by the conventional clutch pedal.

The outer face of the free race ring 14 is contacted by a plurality of radially arranged clutch release levers or fingers 15. The race rings 10 and 14 have the conventional ball race grooves 16 and 17, respectively. The arcuately spaced balls 18 are disposed in transverse openings 19 in the ball retainer ring 20.

Pursuant to the improvement set forth in my prior patent, the retainer ring 20 carries a hub portion 21, which has a sliding fit on the shaft—the shaft in this instance being the hub 11. One end of the hub 21 extends as an annular flange 22 into a counterbore 23 in the fixed race ring 10, the counterbore and the flange 22 providing a running fit. The opposite end of the hub extends as a wider annular flange 24 which has a running fit in the bore of the free race ring 14. Thus of the three rings 10, 14 and 20, only the fixed race ring 10 has a drive fit on the shaft; the other rings have a running fit relative to each other and to the shaft. The purpose of this arrangement is to enable the retainer ring better to hold the balls in alignment with the grooves, especially when the thrust load is relieved.

The component parts are preassembled into a unit by a stamped or spun sheet metal jacket or shell 25 embracing the two race rings. The shell has a deep vertical flange 26 loosely embracing the fixed race ring 10 with a normal clearance of about .005 inch and fixedly embracing the free race ring 14 to rotate therewith. The latter may be conveniently effected by spinning or stamping into the shell an annular shoulder 27 and spinning a shallow outer flange 28 over the chamferred outer edge of the fixed race ring.

Because of the continual slight wear of the retainer ring against the race rings and shaft, I prefer to form the retainer ring of a self-lubricating metal as, for example, the phosphor high lead content bronze or the oil impregnated porous bearing metal as mentioned in my prior patent. For reasons later explained herein, I prefer to make the ball openings 19 of the retainer ring in the form of radially opening pockets not much deeper than the radius of the balls, as is best shown in Fig. 2. The ball circumscribing rim portion of the retainer ring is thus eliminated.

The chief structural changes by which I preferably achieve my present invention are exceedingly simple and few. They do not enlarge the overall dimensions of the bearing unit, nor do they impair the strength of its component parts. They do not involve the addition of any more parts. One structural change is to cut back the rim face of the free race ring and make the face an oblique one leading inwardly to the ball face at the region of the balls. The other change is to oblique the corner of the shell adjacent the vertical flange 26.

Although the function of these two simple changes is difficult of satisfactory scientific explanation, I find that these two changes are surprisingly effective in solving the two-fold problem of grease retention under severe working conditions and of preventing either general or localized stagnation and hardening of the grease within the bearing.

I shall now explain the structural changes in greater detail. First, it will be understood that either before or after the bearing unit is locked into assembly by spinning down the locking flange 28 of the shell, the interior of the bearing is packed full of grease. Preferably the grease is one which is relatively hard at normal temperatures, so that when it is subjected to the heat resulting from long periods of continuous operation, it will not become so liquid that, upon stopping, the grease will run out of the bearing clearance spaces as a liquid under the action of gravity before it has had an opportunity to cool down to a less liquid state.

The clearance space 29 between the vertical flange 26 of the shell and the back face 30 of the fixed race ring 10 need not be reduced in incorporating my present invention; it may remain at about .005 inch, as previously mentioned. The peripheral or rim face of the fixed race ring 10 extending between the back face of the ring and its ball face 31, is cut back to provide an oblique rim face 32, which extends obliquely inwardly from a back edge 33 preferably at the face 30, to a ball face edge 34. In effecting this change, the outside diameter of the fixed race is preferably reduced somewhat, that is, the back edge 33 is of somewhat lesser radius than the outside radius of the fixed race disclosed in my prior patent. The ball face edge 34 preferably comes just radially beyond the ball groove 16 of the fixed race, but radially within a ball circumscribing circle.

Instead of the square corner at the outer back edge of the comparable bearing of my prior patent, I interconnect the vertical flange 26 and the transverse rim portion 36 of the shell by an oblique portion 37. Preferably the oblique portion 37 extends from a point transversely opposite the back edge 33 of the fixed race ring to a point on the rim portion 36 radially opposite some medial point on the oblique face 32 of the fixed race ring, so that the angle of the oblique portion 37 is about 45°. However, this angle and the point of convergence with the rim portion 36 of the shell is subject to considerable latitude without apparent effect upon operation.

With the elimination of the ball circumscribing rim portion of the retainer ring 20, as previously mentioned, these structural changes provide a relatively large and unobstructed grease reservoir space bounded by the balls and retainer ring, the oblique and rim portions 37 and 36 of the shell, and the ball face 38 of the free race ring 14. In addition to the advantages of elimination of grease leakage and augmented internal circulation of the grease, the provision of this enlarged reservoir space has the advantage of accommodating a larger mass of grease without proportionately enlarging the area subject to evaporation. In consequence, the grease as a whole is less subject to drying out. Also, even if there were some leakage, the increased initial amount of grease packed in the bearing would preserve available lubricant for a longer period. This is accomplished without increasing the overall dimensions of the bearing unit and without impairing the essential strength of the parts.

The chief advantages of my invention, however, are the elimination of leakage of grease from the bearing, and the augmented circulation of grease within the bearing. The elimination of the rim portion of the retainer ring, the substitution of radial opening pockets in lieu of the transverse holes for the balls, and the cutting down of the overall diameter of the retainer ring to about the pitch diameter of the balls, contribute to an improved realization of these main advantages, although the changes in the retainer ring are by no means essential to them. I find further that these main advantages are achieved to a considerable degree, even though the corner of the shell remains square rather than being cut off obliquely by the portion 37 of the shell, utilizing only the oblique face 32 of the fixed race ring. Also, leaving the rim face of the fixed race ring square cut and only obliquing the corner of the shell, likewise achieves the main advantages in a measure. But the combination of both these structural changes is peculiarly effective, I find, in a fuller realization of these objectives relating to the retention of grease and the internal circulation thereof.

Some of the several surfaces to which grease in the reservoir is exposed, rotate at the full speed (R. P. M.) of the bearing; some rotate at about half speed; and some are relatively stationary. In general, by my invention these several surfaces—especially as regards their rotary speeds—are so re-arranged and re-proportioned as to be calculated to effect a slowing up of the rotary speed of the grease at certain regions within the bearing with a consequent lessening of the centrifugal pressure of grease at certain regions, whereby the grease pressures in the reservoir and in the clearance space are brought into balance to preclude, or lessen, leakage through the shell clearance, but whereby, preferably, an internal transverse circulation of grease is promoted.

Even if much of the grease in the reservoir were to leak out or evaporate, the capacity of the reservoir would continue to utilize the remaining grease radially outwardly of the line 33'. Should grease on the balls and ball grooves become practically exhausted, the friction would heat up the bearing to thin the grease to a liquid. Whenever there was even a brief stop of the free race ring, some of this liquid grease would run by gravity on to the balls and grooves in sufficient quantity to serve for another running period. Thus the enlarged reservoir space serves as a final insurance against a burned-out bearing.

In Fig. 5 I have shown a modified design of bearing which differs from that of Fig. 3 only in leaving the corner of the shell square cut instead of obliquing it by the portion 37. The design of Fig. 6 is like that of Fig. 3 except that the rim face of the fixed race is left square cut instead of being obliqued. Either of these modifications results in great improvement over the bearing of my prior patent, but neither of them is quite so successful in performance as is the preferred form shown in Fig. 3.

I again call attention to the extreme structural simplicity of my solution to the problems of preventing leakage of grease from the bearing and of promoting effective internal circulation. I have added no more parts. I have subjected no part to increased friction or wear. I have not increased the cost of the bearing. I have not increased its overall dimensions, and thus my new bearing may be employed within the specification limits of prior standard bearings or used as replacements for prior standard bearings. I have not impaired the essential strength of any part. The cutting back of the rim face of the fixed race ring does not come close enough to its ball groove to impair the strength of the race ring in carrying the thrust load. The obliquing of the corner of the shell does not impair its strength.

Despite the simplicity of the changes necessary to effect the maximum of improved operation, I have produced a thrust bearing which can be operated for the normal life of an automotive vehicle on the original filling of grease. This eliminates danger of the bearing running dry. The usual high pressure lubricating nipple may be eliminated. The service operation of greasing the throw-out bearing may be eliminated. With the latter, there is also eliminated the present objection that the clutch throw-out bearing is frequently given an excess amount of grease which finds its way on to the friction surfaces of the clutch and causes the clutch to slip.

I claim:

1. A thrust bearing comprising a fixed race ring, a free race ring side-by-side therewith, round anti-friction elements rolling between the adjacent faces of the rings, and a shell carried by the free race ring and sealed thereto, the shell outwardly embracing the fixed ring and extending radially inwardly along the back thereof in clearance-space proximity thereto, the outer back corner of the shell being cut off obliquely opposite the rim face of the fixed ring.

2. A thrust bearing comprising a fixed race ring, a free race ring side-by-side therewith, round anti-friction elements rolling between the adjacent faces of the rings, and a shell carried by the free race ring and sealed thereto, the shell outwardly embracing the fixed ring and extending radially inwardly along the back thereof in clearance-space proximity thereto, the rim face of the fixed ring being obliqued inwardly from the clearance space and toward the elements.

3. A thrust bearing comprising a fixed race ring, a free race ring side-by-side therewith, round anti-friction elements rolling between the adjacent faces of the rings, and a shell carried by the free race ring and sealed thereto, the shell outwardly embracing the fixed ring and extending radially inwardly along the back thereof in clearance-space proximity thereto, the rim face of the fixed ring being obliqued inwardly toward the elements, and the outer back corner of the shell being cut off obliquely opposite the rim face of the fixed ring.

4. A grease filled and grease retaining unsealed thrust bearing comprising a fixed race ring, a free race ring side-by-side therewith, round anti-friction elements rolling between the adjacent faces of the rings, and a shell carried by the free race ring and sealed thereto, the shell outwardly embracing the fixed ring and extending radially inwardly along the back thereof in clearance-space proximity thereto, the rings, shells and elements defining a grease reservoir within the bearing, the rim of the fixed race ring being of considerably less radius than that of the reservoir-defining portion of the shell whereby an open and relatively large portion of the reservoir extends with considerable radial depth radially outwardly of the fixed ring and to the clearance space.

5. A grease filled and grease retaining unsealed thrust bearing comprising a fixed race ring, a free race ring side-by-side therewith, round anti-friction elements rolling between the adjacent faces of the rings, and a shell carried by the free race ring and sealed thereto, the shell outwardly embracing the fixed ring and extending radially inwardly along the back thereof in clearance-space proximity thereto, the rings, shell and elements defining a grease reservoir within the bearing, the rim of the fixed ring extending between the clearance space and the element-engaging face of the fixed ring and extending obliquely inwardly from a radius considerably inwardly of the outer wall of the reservoir to a radius less than that of a circle circumscribing the elements.

6. A grease filled and grease retaining unsealed thrust bearing comprising a fixed race ring, a free race ring side-by-side therewith, round anti-friction elements rolling between the adjacent faces of the rings, and a shell carried by the free ring and extending over the fixed ring to form, in cooperation with the rings, a grease reservoir opening to the elements and extending radially inwardly along the back of the fixed race ring at only clearance distance therefrom to form therewith a clearance space in communication with the reservoir at an entrance to the clearance space from the reservoir which is radially closer to the elements than to the outermost surface of the reservoir, the reservoir-defining surfaces of the fixed race and of the shell extending obliquely and divergently from the entrance of the clearance space.

7. A grease filled and grease retaining unsealed thrust bearing comprising a fixed race ring, a free race ring, balls rolling between the rings, and a shell carried by the free ring and extending transversely over the fixed ring and extending radially inwardly along the back of the fixed ring at only working distance therefrom to form a clearance space, the shell and rings forming an annular grease reservoir space opening to the balls, the reservoir space annularly communicating with the clearance space at an entrance thereto which is a considerable distance radially inwardly of the transversely extending portion of the shell.

8. A grease filled unsealed thrust bearing comprising a pair of coaxial laterally spaced fixed and loose race rings, balls rolling therebetween, a retainer ring for the balls, and a shell carried by the free race ring extending transversely over the fixed race ring and radially inwardly along the back thereof to form a clearance space, the shell, race rings, balls and retainer ring defining a grease reservoir which communicates annularly with the entrance to the sealing space at a radius considerably less than that of the outer wall of the reservoir, the several surfaces exposed to the grease in the reservoir and influencing its speed having areas and rotary speeds calculated to subject grease within the reservoir and radially inwardly of said entrance to centrifugal pressure less than that of grease filling the clearance space.

9. A grease filled thrust bearing comprising a relatively fixed race ring, a loose race ring, the race rings having laterally opposed grooved faces, a set of balls rolling between the grooves, and a retainer ring for the balls, the loose ring having a jacketing member extending transversely to the fixed ring and together with the rings forming an annular grease reservoir opening inwardly to the balls, the reservoir extending with considerable radial depth between the rim of the fixed ring and the transversely extending jacketing member and the rim being obliqued radially inwardly toward the balls, and the retaining ring terminating radially short of a ball circumscribing circle leaving the reservoir outwardly of the balls internally unobstructed for transverse circulation of grease.

LOUIS H. STEIN.